Figure 6:
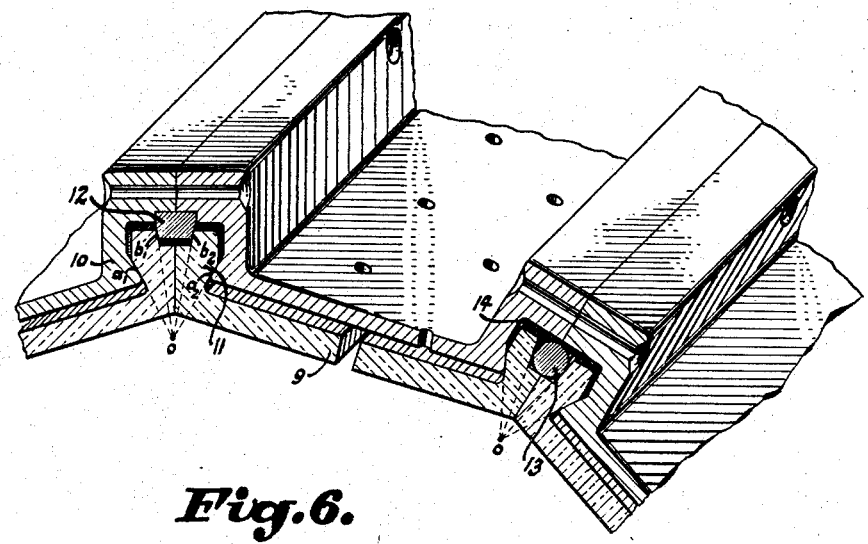

Aug. 17, 1954     C. SCHÖRNER     2,686,655
JOINT BETWEEN CERAMIC AND METALLIC PARTS
Filed Dec. 29, 1949     2 Sheets-Sheet 1
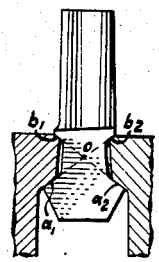
Fig.1.
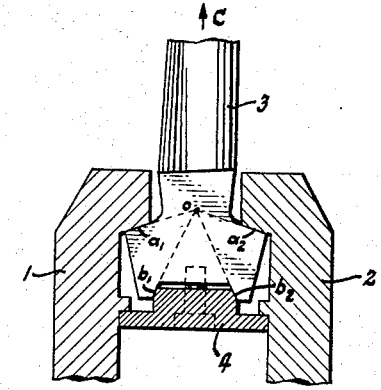
Fig.2.
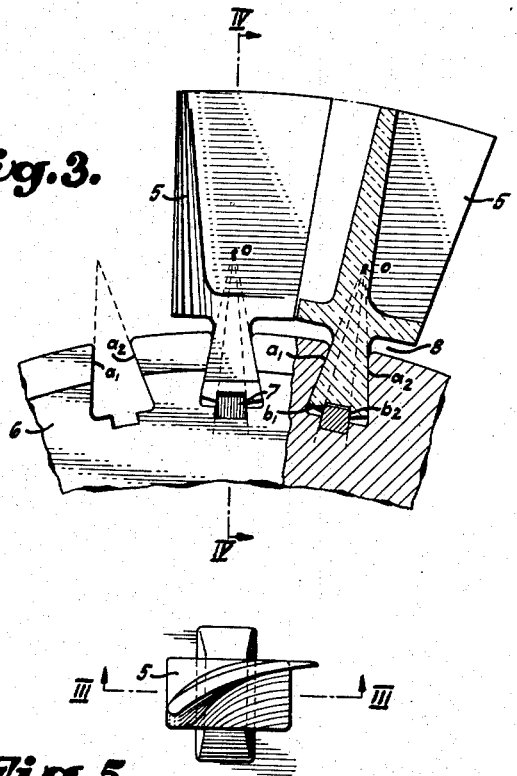
Fig.3.
Fig.5.
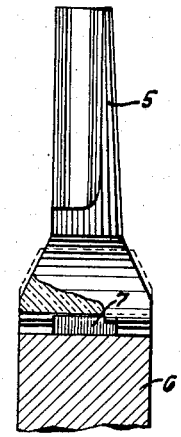
Fig.4.
INVENTOR
Christian Schörner
BY
Marechal & Biebel
ATTORNEYS

Patented Aug. 17, 1954

2,686,655

UNITED STATES PATENT OFFICE 2,686,655

JOINT BETWEEN CERAMIC AND METALLIC PARTS

Christian Schörner, Augsburg, Germany, assignor to Maschinenfabrik Augsburg-Nurnberg A. G., Augsburg, Germany, a corporation of Germany Application December 29, 1949, Serial No. 135,581

Claims priority, application Germany September 2, 1949

14 Claims. (Cl. 253—77)

This invention relates to certain improvements in the means for connecting ceramic and metallic machine parts with each other in such a way that changes of temperature do not affect the joint.

It is the object of the present invention to provide a joint which ensures high mechanical strength, even under severe conditions as to the working temperature and temperature shocks, and a high rated fatigue limit.

With this and other objects in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming part of this application, in which:

Fig. 1 is a side view, partly in section, of a conventional design of a ceramic blade of a turbine engine, seated in the rim of the rotor, Fig. 2 is a similar view of a design having the invention applied thereto, Fig. 3 is an end view of a different form of rotor, partly in section on line III—III of Fig. 5, Fig. 4 is a section through the rotor on line IV—IV of Fig. 3, showing a blade in a side view, Fig. 5 is a plan view of a blade, and Fig. 6 is a perspective sectional view of the wall of a combustion chamber.

Similar reference numerals denote similar parts in the different views.

The connection of constructional elements consisting of materials having different specific heat expansion causes considerable difficulties where higher temperature occurs in operation and where a certain strength is required. Especially is this true with ceramic parts where the shape has a considerable influence upon the rated fatigue limit which must be taken into account in order to attain a maximum of safety in operation in the respective practical case. The requirements as to the strength may widely differ. For instance, in lining firing chambers or reaction chambers by means of ceramic materials the high-temperature stability thereof plays a less important part than the resistance to heat, although a reliable fastening of the lining elements which permits no play at any possible heat conditions and with the vibrations, ignition waves, etc., occurring in operation is of a great importance. A further example are the axial flow blowers of a high thermodynamic efficiency which as is well known require a high quality of the surface of the blades used, in addition to small blade tip clearances. For dust-laden air, therefore, a certain resistance to wear is to be aimed at, in order that there may not result an undesirable drop of efficiency after a short time of operation. The increases of temperature occurring by the compression are not considerable, but the operating conditions still require a rather high rated fatigue limit and fastening free from play of the blades in such a high speed engine. Especially, the position of the blade with respect to the rotor and cylinder shall not affect too much the blade tip clearance in operation by unavoidable displacements of the blade fastening which is independent of the temperature. As is well known, such compressors also may be used for the delivery of preheated or hot air or any other carrier of heat, or they may be inserted in the cycle of a chemical process, where a thermically neutral blade material is required. The same is true for turbine engines which are hot in operation and in which an expansion of the working fluid or propellant takes place. Hence the provisions made in steel parts for the fastening of ceramic blades for compensating the various heat expansions of the parts which are positively or non-positively engaged with each other are of a considerable importance. However, these provisions have to be adapted to the requirements of ceramics as regards maximum rated fatigue limit of the finish fired piece especially regarding the highly stressed root of the blade. As is well known, in order to prevent compressive forces in the clamping of the root, independently of the respective actual heat conditions, and on the other hand to avoid displacements by removal of the positive mutual engagement of the seating surfaces, the seating surfaces at the root of the blade and at the part of the rim of the rotor embracing the root of the blade are arranged so as to form oppositely directed wedge-shaped or conical surfaces whose extensions cut each other in a common line which is straight in case of straight wedge-shaped seats and circular in case of conical seats, as shown in Fig. 1. This design, however, practically leads to shapes of the root of the blade which owing to the special feature of the manufacture of ceramic parts, e. g., by casting a slip in plaster moulds, are disadvantageous for the strength of the constructional element.

According to the present invention, therefore, the pairs of seating surfaces are arranged in such a way that their extensions cut each other in a common line of intersection which passes through the main stress line of the ceramic part, i. e., the line identical with the resultants of centrifugal forces which operate upon every individual blade during rotation of the turbine rotor, said common line of intersection being disposed outside of the quadrangle whose corners are formed by the center points of the two pairs of seating surfaces, whereby the angle formed between any of the seating surfaces and the direction of pull is larger than 90°. Exemplifications of this arrangement are shown in Figs. 2 and 3. Thus the root of the blade is given a shape which corresponds better to the requirements of ceramics. From the maximum cross section of the root the cross section decreases continually up to the tip of the blade, whereby cavities and porous spots with a reduced strength can be substantially avoided in the manufacture of the blade. Thus it is also ensured that the transitional portions of the cross sections are more gradually shaped especially at the points where the forces of the T-head shoulders change their directions, whereby the rated fatigue limit of the finished constructional element comes closer to the strength of the smooth test rod.

The inclination of the bearing surfaces should be chosen with due regard to the strength properties of the steel parts; moreover, the coefficient of friction between the ceramic material and the steel parts should be taken into account, in order to avoid jamming of the wedge shaped surfaces at the root of the blades in case of a mutual displacement due to temperature and centrifugal effects. In order to eliminate as much as possible the influence of inaccuracies in the manufacture and in the working, a large wedge angle would be desirable, whereas this angle is limited with a view to the requirements as regards stiffness against deformation, e. g, of the thickened edge of the rotor (in case of an annular groove for fastening the blade). Of course, it is possible to correct inaccuracies in the manufacture of the width of the groove and of the root of the blade, yet it will be advisable to make the inclination of these surfaces relatively to each other as large as possible. This means a small difference between the inclination of the bearing surface and the inclination of the supporting surface. The corners of the root of the blade which are left at the lower end of the root also need not meet with particular requirements as to their strength.

Referring now to the drawings in greater detail, and first to Fig. 1, it will be seen that the seating surfaces $a_1$, $a_2$, $b_1$, and $b_2$ in this case are arranged in a conventional manner at the root of the ceramic blade being oriented so that their extensions will cut each other in a common line of intersection, whose projection is indicated at $o$.

The seating surfaces are either conical surfaces in case of securement of the blades in annular grooves or wedge-shaped surfaces in case of this securement in axial directed straight grooves.

Fig. 2 shows the interchange according to the invention of the position of the bearing seats $a_1$, $a_2$ with the seats $b_1$, $b_2$ having a supporting function only in relation to the pull occurring in operation in a blade 3 clamped in an annular groove between the halves 1 and 2 of the rotor. The common line of intersection $o$ of the seating surfaces in this case is positioned outside of the quadrangle formed by the center points of the seating surfaces $a_1$, $a_2$, $b_1$ and $b_2$, being removed therefrom in the direction of the pull C. The seating surfaces $b_1$, $b_2$ ensuring the positive engagement are arranged at the ring 4 for constructional reasons, which ring may also be used for fastening the single blades in a peripheral direction, as indicated in Fig. 2. In case of integral rotor halves, i. e., in case of a turned-in annular groove it is also possible to provide a prism with the surfaces $b_1$, $b_2$ which is supported on the bottom of the groove, as discussed in greater detail with respect to the exemplification shown in Figs. 3, 4, and 5. In order that the reinforced edges of the two carrier discs may not be exposed to undue stresses (especially owing to the resulting high lateral thrusts) when operating the blade system at a high temperature, the angle $a_1$—$o$—$a_2$ will be made relatively large.

Figs. 3, 4 and 5 show in several views a solution according to the invention in case the blades are secured in axially directed grooves of the rotor. In this case it is possible to use very flat wedge-shaped seating surfaces which are favorable for changing the direction of the mechanical forces and therefore for the rated fatigue limit, since the resulting considerable lateral thrusts due to the centrifugal force of the blade mutually support each other with respect to the single blades of the circumference of the rotor. The blade 5 has a wedge-shaped root for engagement with the lateral bearing surfaces $a_1$, $a_2$ of the grooves in the steel rotor 6. The tight engagement is ensured by the also wedge-shaped seating surfaces $b_1$, $b_2$ of an inserted small prismatic rod 7 of steel, whereby it is also possible to compensate dimensional deviations to a certain extent. It is an additional advantage that the steel rotor parts are shielded by the air gap resulting at 8 underneath the foot plate of the ceramic blade. It will be understood, moreover, that in case of suitable spatial conditions the root and the appertaining groove of the rotor need not be arranged perpendicularly to the plane of the disc, as shown in Fig. 3. On the contrary it will be advantageous as regards the rated fatigue limit of the blade, owing to the more continuous course of the tension, to turn this wedge-shaped root so that its main longitudinal direction conforms as much as possible to the direction of the chord of the blade portion of the vane and the foot plate of the blade in conformity with this distortion assumes more or less a parallelogram contour.

The arrangement of the seating surfaces at the lower end of the root of the blade is particularly advantageous because the temperature field of the blade at this point is already more uniform, which is particularly favorable for the efficiency of the design according to the invention. The main drop of temperature in fact occurs at the root portion up to the point at the bearing T-head seat where the heat is lead off, so that the root portions which are decisive for the fastening of the blade are somewhat more in the shadow of the heat flux. Moreover, the effect of the pull due to centrifugal forces acting upon the fit of the surfaces supporting each other is much less important for the position of the seating surfaces according to the present invention.

The fastening method as shown for blades in Figs. 2 to 5, with seating surfaces tightly engaging each other and being insensitive to influences of temperature can also be applied to the ceramic plate elements of lined combustion or firing chambers. A section through part of a lining of a chamber is shown in Fig. 6. The lining elements 9 are mounted on a steel frame 10 which is cooled by circulation of air, and consist of a suitable ceramic material, which is thermal shock resistant. The plate elements or slabs 9 engaging each other form a wedge-shaped locking member 11 whose seating surfaces $a_1$, $a_2$ are seated in the steel frame 10. The seating surfaces $b_1$, $b_2$ ensuring the positive engagement are provided at the small prismatic rods 12. The vanishing point $o$ of the seating surfaces $a_1$, $a_2$ and $b_1$, $b_2$ again is positioned outside of the quadrangle formed by the center points of the four seating surfaces.

In Fig. 6 it is indicated in the right hand row of slabs that a linear contact would also be sufficient for ensuring the positive engagement. This linear contact is effected by the insertion of steel bolts 13, using a spacing piece 14 which permits in a simple manner the correction of inaccuracies in the manufacture.

While the invention has been described in detail with respect to some now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. In a machine having ceramic parts and associated metal parts of substantially different heat expansion characteristics and both subjected in operation to substantial temperatures and changes of temperature and to mechanical forces tending to separate said ceramic and metal parts acting along a resultant force line, an interlocking joint for mounting said ceramic parts in said metal parts for maintaining a tight, substantially vibrationless, expansion-compensating fit notwithstanding said operational conditions which comprises two pairs of converging seating surfaces on said ceramic part and corresponding seating surfaces on said metal part for cooperating engagement with said ceramic surfaces to provide said fit, projections of all said surfaces on a cross section through said ceramic part mutually intersecting each other at a common point which lies outside a quadrangle defined by the center points of said surfaces, said surfaces of each said pair being on opposite sides of said resultant force line and converging theretoward and the surfaces of one said pair facing in the opposite direction from the other said pair for resisting oppositely directed forces on said ceramic part.

2. In a machine having ceramic parts and associated metal parts of substantially different heat expansion characteristics and both subjected in operation to substantial temperatures and changes of temperature and mechanical forces tending to separate said ceramic and metal parts and resultant in a main stress line in said ceramic parts, an interlocking joint for mounting said ceramic parts in said metal parts for maintaining a tight, substantially vibrationless, expansion-compensating fit notwithstanding said operational conditions which comprises two pairs of converging seating surfaces on said ceramic part and corresponding seating surfaces on said metal part for cooperating engagement with said ceramic surfaces to provide said fit, projections of all said surfaces on a cross section through said ceramic part mutually intersecting each other at a common point on said main stress line of said parts and which lies outside a quadrangle defined by the center points of said surfaces, one surface of each said pair being on each side of said main stress line and converging theretoward and the surfaces of one said pair facing in the opposite direction from the other said pair for resisting oppositely directed forces on said ceramic part.

3. In a machine having ceramic parts and associated metal parts of substantially different heat expansion characteristics and both subjected in operation to substantial temperatures and changes of temperature and to mechanical forces tending to separate said ceramic and metal parts acting along a resultant force line, an interlocking joint for mounting said ceramic parts in said metal parts for maintaining a tight, substantially vibrationless, expansion-compensating fit notwithstanding said operational conditions which comprises two pairs of converging seating surfaces on said ceramic part and corresponding seating surfaces on said metal part for cooperating engagement with said ceramic surfaces to provide said fit, projections of all said surfaces mutually intersecting each other at a common point which lies outside a quadrangle defined by the center points of said surfaces, and the angle between each of said surfaces and said resultant force line of said ceramic and metal parts being greater than 90°, said surfaces of each said pair being on opposite sides of said resultant force line and converging theretoward and the surfaces of one said pair facing in the opposite direction from the other said pair for resisting oppositely directed forces on said ceramic part.

4. In a machine having ceramic parts and associated metal parts of substantially different heat expansion characteristics and both subjected in operation to substantial temperatures and changes of temperature and mechanical forces tending to separate said ceramic and metal parts and resultant in a main stress line in said ceramic parts, an interlocking joint for mounting said ceramic parts in said metal parts for maintaining a tight, substantially vibrationless, expansion-compensating fit notwithstanding said operational conditions which comprises two pairs of converging seating surfaces on said ceramic part and corresponding seating surfaces on said metal part for cooperating engagement with said ceramic surfaces to provide said fit, projections of all said surfaces mutually intersecting each other at a common point on said main stress line of said parts and which lies outside a quadrangle defined by the center points of said surfaces, and the angle between each of said surfaces and the direction line of said forces tending to separate said ceramic and metal parts being greater than 90°, one surface of each said pair being on each side of said main stress line and converging theretoward and the surfaces of one said pair facing in the opposite direction from the other said pair for resisting oppositely directed forces on said ceramic part.

5. In a machine having ceramic parts and associated metal parts of substantially different heat expansion characteristics subjected in operation to substantial temperatures and temperature changes and to mechanical forces tending to pull said ceramic parts away from said metal parts and acting along a resultant force line, an interlocking joint for mounting said ceramic parts in said metal parts for maintaining a tight, substantially vibrationless, expansion-compensating fit which comprises a first pair of converging seating surfaces on said ceramic part, corresponding seating surfaces on said metal part for cooperating engagement with said first ceramic surfaces for resisting said mechanical forces, a second pair of converging seating surfaces on said ceramic part, and corresponding seating surfaces on said metal part for cooperating engagement with said second ceramic surfaces for maintaining tight, substantially vibrationless engagement of said first ceramic and metal surfaces, the angle between each of said surfaces and said resultant force line being greater than 90°, said surfaces of each said pair being on opposite sides of said resultant force line and converging theretoward and the surfaces of one of said pair facing in the opposite direction from the other said pair for resisting oppositely directed forces on said ceramic part.

6. A ceramic machine part adapted for mounting in a metal machine part of substantially different heat expansion characteristics subjected in operation to substantial temperatures and temperature changes and to mechanical forces tending to separate said parts and acting along a resultant force line which comprises a root portion for insertion into said metal part, two pairs of converging seating surfaces on said root portion for engagement with cooperating seating surfaces in said metal part for maintaining tight, substantially vibrationless, expansion-compensating fit between said parts notwithstanding said operational conditions, projections of all said ceramic seating surfaces on a cross section through said root portion mutually intersect each other at a common point which lies outside a quadrangle defined by the center points of said surfaces, said surfaces of each said pair being on opposite sides of said resultant force line and converging theretoward and the surfaces of one said pair facing in the opposite direction from the other said pair for resisting oppositely directed forces on said ceramic part.

7. A ceramic machine part adapted for mounting in a metal machine part of substantially different heat expansion characteristics subjected in operation to substantial temperatures and temperature changes and mechanical forces tending to separate said parts and resultant in a main stress line in said ceramic part which comprises a root portion for insertion into said metal part, two pairs of converging seating surfaces on said root portion for engagement with cooperating seating surfaces in said metal part for maintaining tight, substantially vibrationless, expansion-compensating fit between said parts notwithstanding said operational conditions, projections of all said ceramic seating surfaces on a cross section through said root portion mutually intersecting each other at a common point on said main stress line of said ceramic part and which lies outside a quadrangle defined by the center points of said surfaces, one surface of each said pair being on each side of said main stress line and converging theretoward and the surfaces of one said pair facing in the opposite direction from the other said pair for resisting oppositely directed forces on said ceramic part.

8. A ceramic machine part adapted for mounting in a metal machine part of substantially different heat expansion characteristics subjected in operation to substantial temperatures and temperature changes and to mechanical forces tending to separate said parts and acting along a resultant force line which comprises a root portion for insertion into said metal part, two pairs of converging seating surfaces on said root portion for engagement with cooperating seating surfaces in said metal part for maintaining tight, substantially vibrationless, expansion-compensating fit between said parts notwithstanding said operational conditions, projections of all said ceramic seating surfaces on a cross section through said root portion mutually intersecting each other at a common point which lies outside a quadrangle defined by the center points of said surfaces, and the angle between each of said ceramic surfaces and said resultant force line being greater than 90°, said surfaces of each said pair being on opposite sides of said resultant force line and converging theretoward and the surfaces of one said pair facing in the opposite direction from the other said pair for resisting oppositely directed forces on said ceramic part.

9. A ceramic machine part adapted for mounting in a metal machine part of substantially different heat expansion characteristics subjected in operation to substantial temperatures and temperature changes and mechanical forces tending to separate said parts and resultant in a main stress line in said ceramic part which comprises a root portion for insertion into said metal part, two pairs of converging seating surfaces on said root portion for engagement with cooperating seating surfaces in said metal part for maintaining tight, substantially vibrationless, expansion-compensating fit between said parts notwithstanding said operational conditions, said surfaces being arranged such that projections of all said ceramic seating surfaces on a cross section through said ceramic part mutually intersect each other at a common point on said main stress line of said ceramic part and which lies outside a quadrangle defined by the center points of said surfaces, the angle between each of said surfaces and said main stress line of said parts being greater than 90°, one surface of each said pair being on each side of said main stress line and converging theretoward and the surfaces of one said pair facing in the opposite direction from the other said pair for resisting oppositely directed forces on said ceramic part.

10. A ceramic machine part adapted for mounting in a metal machine part of substantially different heat expansion characteristics subjected in operation to substantial temperatures and temperature changes, and to mechanical forces tending to separate said parts and acting along a resultant force line, which comprises a root portion for insertion into said metal part, a first pair of converging seating surfaces on said root portion for engagement with cooperating seating surfaces on said metal part to resist said forces tending to separate said parts, a second pair of converging seating surfaces on said root portion for engagement with second cooperating seating surfaces in said metal part for maintaining tight, substantially vibrationless, expansion compensating fit between said first ceramic and metallic seating surfaces, the angle between each of said ceramic surfaces and the direction line of said forces tending to separate said parts being greater than 90°, said surfaces of each said pair being on opposite sides of said resultant force line and converging theretoward and the surfaces of one said pair facing in the opposite direction from the other said pair for resisting oppositely directed forces on said ceramic part.

11. In a machine having ceramic parts and associated metal parts of substantially different heat expansion characteristics subjected in operation to substantial temperatures and temperature changes and mechanical forces tending to pull said ceramic parts away from said metal parts, an interlocking joint for mounting said ceramic parts in said metal parts for maintaining a tight, substantially vibrationless, expansion-compensating fit which comprises a first pair of converging seating surfaces on said ceramic part, corresponding seating surfaces on said metal part for cooperating engagement with said first ceramic surfaces for resisting said mechanical forces, a second pair of converging seating surfaces on said ceramic part, and a separate locking member adjacent said second ceramic surfaces and having seating surfaces for cooperating engagement therewith, said second surfaces facing in the opposite direction from said first surface to resist oppositely directed forces for maintaining tight, substantially vibrationless, expansion-compensating fit between said first ceramic and metal surfaces, the angle between each of said surfaces and the direction line of said forces tending to pull said ceramic part away from said metal part being greater than 90°, and projections of all said surfaces on a cross section through said ceramic part mutually intersecting each other at a common point which lies outside a quadrangle defined by the center points of said surfaces.

12. In a circular machine assembly having mounted around the circumference thereof separate ceramic parts having thermal expansion characteristics substantially different from said assembly and being subjected to substantial temperatures and temperature changes and to mechanical forces tending to separate said ceramic parts from said assembly and acting along a resultant force line, an interlocking joint for mounting said ceramic parts on said assembly for a tight, substantially vibrationless, expansion-compensating fit therebetween comprising for each of said ceramic parts a ceramic root portion on said part for insertion into said assembly, two pairs of converging seating surfaces on said root portion, and corresponding seating surfaces in said assembly for cooperating engagement with said ceramic surfaces to provide said fit, projections of all said surfaces on a cross section through said root portion mutually intersecting each other at a common point which substantially coincides with the resultant of said centrifugal forces and which lies outside a quadrangle defined by the center points of said surfaces, and the angle between each of said surfaces and said resultant force line being greater than 90°, said surfaces of each said pair being on opposite sides of said resultant force line and converging theretoward and the surfaces of one said pair facing in the opposite direction from the other said pair for resisting oppositely directed forces on said ceramic part.

13. In a turbine engine having a metal rotor and a plurality of ceramic blades mounted around the periphery thereof, said rotor and blades being subjected in operation to substantial temperatures and temperature changes and great mechanical and centrifugal forces resultant in a main stress line in said blades, said ceramic blades and said metal rotor having substantially different thermal expansion characteristics, an interlocking joint for each of said ceramic blades for mounting said ceramic blade in said metal rotor to maintain a tight expansion-compensating fit notwithstanding said operational conditions which comprises on each said ceramic blade two pairs of converging ceramic seating surfaces and corresponding seating surfaces in said metal rotor for cooperating engagement with said ceramic surfaces to provide said fit, projections of said surfaces on a cross section through said blade mutually intersecting each other at a common point on said main stress line of said blades and lying outside a quadrangle defined by the center points of said surfaces, and the angle between each of said surfaces and the said main stress line being greater than 90°, one surface of each said pair being on each side of said main stress line and converging theretoward and the surfaces of one said pair facing in the opposite direction from the other said pair for resisting oppositely directed forces on said ceramic part.

14. In a machine of the character described having a metal wall portion and a shielding of ceramic members overlying said metal wall, both said metal wall and said ceramic shielding being subjected in operation to substantial temperatures and temperature changes and to mechanical forces tending to separate said ceramic shielding from said metal wall and resultant in a main stress line in said ceramic members, an interlocking joint for each of said ceramic shielding members for mounting said members on said metal wall in tight, expansion-compensating fit notwithstanding said operational conditions which comprises for each said ceramic member a ceramic root portion on said member for insertion into said metal wall, two pairs of converging seating surfaces on said root portion, and corresponding seating surfaces in said metal wall for cooperating engagement with said ceramic surfaces to provide said fit, projections of all said ceramic surfaces mutually intersecting each other at a common line which passes through the main stress line and which lies outside a quadrangle formed on a cross section through said ceramic surfaces by the center points of said surfaces, the angle between each of said surfaces and said main stress line being greater than 90°, one surface of each said pair being on each side of said main stress line and converging theretoward and the surfaces of one said pair facing in the opposite direction from the other said pair for resisting oppositely directed forces on said ceramic part.

References Cited in the file of this patent

UNITED STATES PATENTS

| Number | Name | Date |
|---|---|---|
| 886,515 | Jude | May 5, 1908 |
| 1,619,133 | Kasley | Mar. 1, 1927 |
| 2,317,338 | Rydmark | Apr. 20, 1943 |
| 2,421,855 | Soderberg | June 10, 1947 |

FOREIGN PATENTS

| Number | Country | Date |
|---|---|---|
| 312,864 | Italy | Nov. 28, 1933 |
| 602,149 | Great Britain | May 20, 1948 |
| 614,678 | Great Britain | Dec. 20, 1948 |
| 871,622 | France | Jan. 19, 1942 |